(12) United States Patent
Penner

(10) Patent No.: US 10,842,149 B2
(45) Date of Patent: Nov. 24, 2020

(54) WATER CONDITIONING ADJUVANT COMPOSITIONS AND RELATED METHODS FOR REDUCING HERBICIDE VOLATILITY

(71) Applicant: BOARD OF TRUSTEES OF MICHIGAN STATE UNIVERSITY, East Lansing, MI (US)

(72) Inventor: Donald Penner, Williamston, MI (US)

(73) Assignee: BOARD OF TRUSTEES OF MICHIGAN STATE UNIVERSITY, East Lansing, MI (US)

( * ) Notice: Subject to any disclaimer, the term of this patent is extended or adjusted under 35 U.S.C. 154(b) by 110 days.

(21) Appl. No.: 16/130,455

(22) Filed: Sep. 13, 2018

(65) Prior Publication Data
US 2019/0075788 A1 Mar. 14, 2019

Related U.S. Application Data

(60) Provisional application No. 62/558,029, filed on Sep. 13, 2017.

(51) Int. Cl.
| | | |
|---|---|---|
| *A01N 25/00* | (2006.01) | |
| *A01N 25/32* | (2006.01) | |
| *A01N 37/10* | (2006.01) | |
| *A01N 57/20* | (2006.01) | |
| *A01N 43/88* | (2006.01) | |

(52) U.S. Cl.
CPC ............ *A01N 25/32* (2013.01); *A01N 25/00* (2013.01); *A01N 37/10* (2013.01); *A01N 43/88* (2013.01); *A01N 57/20* (2013.01); *A01N 2300/00* (2013.01)

(58) Field of Classification Search
None
See application file for complete search history.

(56) References Cited

U.S. PATENT DOCUMENTS

| | | | |
|---|---|---|---|
| 2,522,488 A * | 9/1950 | Bersworth | C07C 59/70 562/472 |
| 5,945,377 A | 8/1999 | Penner et al. | |
| 9,750,243 B2 * | 9/2017 | Di Modugno | A01N 37/10 |
| 2012/0142532 A1 | 6/2012 | Wright et al. | |
| 2016/0255832 A1 | 9/2016 | Penner | |

FOREIGN PATENT DOCUMENTS

| | | |
|---|---|---|
| CN | 101633903 A * | 1/2010 |
| CN | 101690498 A * | 4/2010 |
| DE | 210828 A1 * | 6/1984 |
| PL | 191192 B1 * | 3/2006 |
| WO | WO-2016/015056 A1 | 1/2016 |

OTHER PUBLICATIONS

Bottino et al.( Tissue culture and organogenesis in the winged bean, Canadian Journal of Botany (1979), 57(17), 1773-6). (Year: 1979).*
Penner et al., "Water Conditioners and Growth Regulator Herbicides," Pesticide Formulation and Delivery Systems: 34th Volume, Translating Basic Science into Products, STP 1579, Yasmith Bernal, Ed., pp. 116-123, doi:10.1520/STP157920130157, ASTM International, West Conshohocken, PA 2015 (published online Nov. 7, 2014).

* cited by examiner

*Primary Examiner* — Alton N Pryor
(74) *Attorney, Agent, or Firm* — Marshall, Gerstein & Borun LLP

(57) ABSTRACT

The disclosure relates to adjuvant compositions and related methods for reducing herbicide volatility and/or enhancing herbicide activity. The adjuvant- and herbicide-containing compositions are generally aqueous and include a volatile growth regulator herbicide, an aminopolycarboxylate salt water conditioner, and (optionally) a glyphosate herbicide. The compositions generally have a mildly acidic to mildly basic pH value. When the compositions are applied to a target area to control a target plant in the area with the herbicide, the aminopolycarboxylate salt water conditioner can both potentiate the herbicide as well as reduce volatile transport of the herbicide, thus reducing damage to other (non-target) sensitive plants, whether inside or outside of the target area of application.

26 Claims, No Drawings

WATER CONDITIONING ADJUVANT COMPOSITIONS AND RELATED METHODS FOR REDUCING HERBICIDE VOLATILITY

CROSS REFERENCE TO RELATED APPLICATION

Priority is claimed to U.S. Provisional Application No. 62/558,029 (filed Sep. 13, 2017), which is incorporated herein by reference in its entirety.

STATEMENT OF GOVERNMENT INTEREST

None.

BACKGROUND OF THE DISCLOSURE

Field of the Disclosure

The disclosure generally relates to water-conditioning adjuvant compositions and related methods for reducing herbicide volatility. The adjuvant- and herbicide-containing compositions generally include a volatile growth regulator herbicide, a glyphosate herbicide, or a weakly anionic herbicide, and an aminopolycarboxylate salt water conditioner.

Brief Description of Related Technology

Volatilization of herbicides from soils and plants can result in undesirable loss of the active herbicide ingredient as well as unintended injury to nearby plants. Volatile growth regulator herbicides such as 2,4-D and dicamba can cause damage to neighboring, herbicide-sensitive plants resulting from volatile transport of the herbicide within its intended target area and to other neighboring areas including the herbicide-sensitive plants.

Penner U.S. Publication No. 2016/0255832 discloses adjuvant compositions and related methods for reducing herbicide volatility. The adjuvant- and herbicide-containing compositions generally include a volatile growth regulator herbicide and a monosaccharide adjuvant.

Penner et al. U.S. Pat. No. 5,945,377 discloses compositions incorporating a non-volatile, post-emergence herbicide and a monosaccharide, particularly fructose, as a potentiator of the herbicide against weeds without decreasing tolerance of a crop plant to the herbicide. The compositions are used as a spray in water in a method for killing weeds.

SUMMARY

The disclosure relates to adjuvant compositions and related methods for reducing herbicide volatility. The adjuvant- and herbicide-containing compositions generally include a volatile growth regulator herbicide, a glyphosate herbicide, or a weakly anionic herbicide, and an aminopolycarboxylate salt water conditioner. The compositions generally have a mildly acidic to mildly basic pH value (e.g., pH value of at least about 4.5 or 5), which can allow the water conditioner to remain active as a chelator in salt form (e.g., as compared to an acid form). When the compositions are applied to a target area to control a target plant (e.g., a weed or other undesired plant) in the area with the herbicide, the aminopolycarboxylate salt water conditioner can both potentiate the herbicide as well as reduce volatile transport of the herbicide, thus reducing damage to other (non-target) sensitive plants, whether inside or outside of the target area of application. For example, the aminopolycarboxylate salt water conditioner can potentiate herbicide, thus potentially reducing the dosage of the herbicide applied to the target area for control of the target plant, which in turn reduces the volatile transport of the herbicide from the target area. The compositions are suitably aqueous, and they can be in a relatively concentrated form (e.g., intended to be diluted with water, optionally with the addition of other additives or adjuvants prior to use) or in a relatively dilute form (e.g., as a spray solution; at concentrations suitable for spraying or other application to a target area without dilution).

In one aspect, the disclosure relates to a composition comprising: (a) water; (b) an aminopolycarboxylate salt water conditioner (e.g., metal-chelating salts of diethylenetriaminepentaacetic acid (DTPA), ethylenediaminetetraacetic acid (EDTA)); and (c) at least one of a volatile growth regulator herbicide (e.g., 2,4-D and/or dicamba, including derivatives or analogs thereof), a glyphosate herbicide (e.g., including derivatives or analogs thereof), and a weakly anionic herbicide (e.g., glufosinate and/or bentazon, including derivatives or analogs thereof); wherein the composition has a pH value of at least 4.5. Suitably, the composition has a pH value in a range from 4.5 to 10 (e.g., at least 4.5, 4.8, 5, 5.5, 6, 6.5 or 7 and/or up to 7, 7.5, 8, 9, or 10; such as pH of 4.5 to 7.5 or 5 to 7).

Various refinements of the disclosed composition are possible.

In a refinement, the aminopolycarboxylate salt comprises a metal salt of an aminopolycarboxylic acid selected from the group consisting of diethylenetriaminepentaacetic acid (DTPA), ethylenediaminetetraacetic acid (EDTA), hydroxyethylethylenediaminetriacetic acid (HEDTA), nitrilotriacetic acid (NTA), and iminodiacetic acid (IDA). For example, the aminopolycarboxylate salt can include partial or complete metal salts of the foregoing aminopolycarboxylic acids (e.g., some or all of the carboxylic acid functional groups are in metal carboxylate form), depending on the resulting pH properties of the aminopolycarboxylate salt and the composition as a whole in view of the minimum pH value for the composition. The composition is generally free from corresponding aminopolycarboxylic acids in complete acid form. The aminopolycarboxylate salt has at least 1 amino group and at least 2 carboxylate/carboxylic groups for a total of at least 3 metal-binding groups for metal complex formation/chelation. Preferably, the aminopolycarboxylate salt has at least 5, 6, 7 or 8 and/or up to 7, 8, or 10 metal-binding groups (e.g., including amino groups and carboxylate/carboxylic groups combined). In a further refinement, the aminopolycarboxylate salt comprises an alkali metal salt of the aminopolycarboxylic acid (e.g., sodium salt and/or potassium salt).

In another refinement, the aminopolycarboxylate salt is present in the composition in an amount ranging from 0.1 wt. % to 10 wt. % (e.g., 0.5 wt. % to 5 wt. % or 0.7 wt. % to 3 wt. %). In various embodiments, the aminopolycarboxylate salt is present in an amount of at least about 0.1 wt. %, 0.2 wt. %, 0.5 wt. %, 0.7 wt. %, or 1 wt. % and/or up to about 1.5 wt. %, 2 wt. %, 3 wt. %, 5 wt. % or 10 wt. % relative the composition as a whole. The foregoing amounts can apply to aminopolycarboxylate salt species individually or all aminopolycarboxylate salt species collectively present.

In another refinement, the composition comprises the volatile growth regulator herbicide.

In another further refinement, the volatile growth regulator herbicide comprises one or more of 2,4-dichlorophenoxyacetic acid (2,4-D), 2,4,5-trichlorophenoxyacetic acid (2,4,5-T), 2-methyl-4-chlorophenoxyacetic acid (MCPA), 2-(2-methyl-4-chlorophenoxy)propionic acid (mecoprop, MCPP), 4-(4-chloro-o-tolyloxy)butyric acid (MCPB), 2-(2, 4-dichlorophenoxy)propionic acid (dichlorprop, 2,4-DP), (2,4-dichlorophenoxy)butyric acid (2,4-DB), 3,6-dichloro-2-methoxybenzoic acid (dicamba), 4-amino-3,5,6-trichloropicolinic acid (picloram), 3,5,6-trichloro-2-pyridinyloxyacetic acid (triclopyr), 3,6-dichloro-2-pyridinecarboxylic acid (clopyralid), salts thereof, esters thereof, and amides thereof. Example herbicide derivative forms include salts (e.g., metal salt such as alkali and/or alkali earth metal salt, preferably sodium or potassium; amine salt such as mono-, di-, or tri-alkyl, alkanol, or alkoxyalkanol amine ($C_1$, $C_2$, $C_3$ or $C_4$ alkyl/alkanol/alkoxyalkanol groups such as methyl/methanol, ethyl/ethanol/ethoxyethanol, isopropyl/isopropanol such as in dimethylamine, diethanolamine, isopropylamine, triisopropanolamine, diglycolamine (aminoethoxyethanol) salts); organic salt such as choline (e.g., including alkyl, alkanol, and amine/ammonium groups)), esters (e.g., alkyl esters ($C_1$ or $C_3$ to $C_8$ or $C_{12}$ alkyl groups such as isopropyl, ethylhexyl), and amides (e.g., alkyl amides ($C_1$ or $C_3$ to $C_8$ or $C_{12}$ alkyl groups such as isopropyl, ethylhexyl).

In another further refinement, the volatile growth regulator herbicide comprises one or more of salts and esters of 2,4-dichlorophenoxyacetic acid (2,4-D), and the composition is free from volatile growth regulator herbicides other than 2,4-dichlorophenoxyacetic acid (2,4-D) and derivatives thereof (e.g., where the acid form and/or other salts and esters other than those added to the composition might be present form various equilibrium reactions).

In another further refinement, the volatile growth regulator herbicide comprises one or more of salts and esters of 3,6-dichloro-2-methoxybenzoic acid (dicamba), and the composition is free from volatile growth regulator herbicides other than 3,6-dichloro-2-methoxybenzoic acid (dicamba) and derivatives thereof (e.g., where the acid form and/or other salts and esters other than those added to the composition might be present form various equilibrium reactions).

In another further refinement, the volatile growth regulator herbicide is present in the composition in an amount ranging from 0.01 wt. % to 10 wt. % (e.g., 0.1 wt. % to 5 wt. %). In various embodiments, the volatile growth regulator herbicide is present in an amount of at least about 0.01 wt. %, 0.1 wt. %, 0.2 wt. %, 0.5 wt. %, 0.7 wt. %, or 1 wt. % and/or up to about 1.5 wt. %, 2 wt. %, 3 wt. %, 5 wt. % or 10 wt. % relative the composition as a whole. The foregoing amounts can apply to volatile growth regulator herbicide species individually or all volatile growth regulator herbicide species collectively present (e.g., multiple forms of the same type of herbicide and/or multiple types of different herbicides).

In another refinement, the composition comprises the glyphosate herbicide. In a further refinement, the glyphosate herbicide comprises one or more of glyphosate (N-(phosphonomethyl)glycine), salts thereof, and esters thereof (e.g., isopropylamine, diammonium, monoammonium, or potassium salts in particular or any of the other derivatives described herein for volatile growth regulator herbicides). In a further refinement, the glyphosate herbicide is present in the composition in an amount ranging from 0.01 wt. % to 10 wt. % (e.g., 0.1 wt. % to 5 wt. %). In various embodiments, the glyphosate herbicide is present in an amount of at least about 0.01 wt. %, 0.1 wt. %, 0.2 wt. %, 0.5 wt. %, 0.7 wt. %, or 1 wt. % and/or up to about 1.5 wt. %, 2 wt. %, 3 wt. %, 5 wt. % or 10 wt. % relative the composition as a whole. The foregoing amounts can apply to glyphosate herbicide species individually or all glyphosate herbicide species collectively present (e.g., multiple forms of the same type of herbicide and/or multiple types of different herbicides).

In another refinement, the composition comprises the weakly anionic herbicide. In a further refinement, the weakly anionic herbicide comprises one or more of glufosinate, bentazon, salts thereof, and esters thereof (e.g., ammonium, sodium, or potassium salts in particular or any of the other derivatives described herein for volatile growth regulator herbicides). In a further refinement, the weakly anionic herbicide is present in the composition in an amount ranging from 0.01 wt. % to 10 wt. % (e.g., 0.1 wt. % to 5 wt. %). In various embodiments, the weakly anionic herbicide is present in an amount of at least about 0.01 wt. %, 0.1 wt. %, 0.2 wt. %, 0.5 wt. %, 0.7 wt. %, or 1 wt. % and/or up to about 1.5 wt. %, 2 wt. %, 3 wt. %, 5 wt. % or 10 wt. % relative the composition as a whole. The foregoing amounts can apply to weakly anionic herbicide species individually or all weakly anionic herbicide species collectively present (e.g., multiple forms of the same type of herbicide and/or multiple types of different herbicides).

In another refinement, the composition can be in the form of a spray solution and may contain one or more hard water cations selected from the group consisting of $Ca^{2+}$ ions, $Mg^{2+}$ ions, $Fe^{2+}$ ions, $Fe^{3+}$ ions, $Al^{3+}$ ions, and combinations thereof (e.g., more generally metal ions characteristic of hard water used for herbicidal composition formulation). In a further refinement, the composition comprises the volatile growth regulator herbicide; and the composition is substantially free from salts of volatile growth regulator herbicide and the hard water cations (e.g., less than 5, 2, 1, 0.5, 0.2, or 0.1 wt. % of the volatile growth regulator herbicide in the composition is in salt form with the hard water cations; at least 95, 98, 99, 99.5, 99.8, or 99.9 wt. % of the volatile growth regulator herbicide in the composition is in a form other than a salt with the hard water cations). Metal salts of the hard water cations and the weak acid volatile growth regulator herbicide can be more volatile than the form of the volatile growth regulator herbicide as provided to the composition, so the formation of such salts is preferably avoided/prevented/reduced with the aminopolycarboxylate salt water conditioner. Even when the composition does not contain hard water cations as provided, the composition remains substantially free from such salts of the herbicide when exposed to hard water cations from another source such as in the environment or when diluted with hard water. In a further refinement, the composition comprises the glyphosate herbicide; and the composition is substantially free from salts of the glyphosate herbicide and the hard water cations (e.g., less than 5, 2, 1, 0.5, 0.2, or 0.1 wt. % of the glyphosate herbicide in the composition is in salt form with the hard water cations; at least 95, 98, 99, 99.5, 99.8, or 99.9 wt. % of the glyphosate herbicide in the composition is in a form other than a salt with the hard water cations). In a further refinement, the composition comprises the weakly anionic herbicide; and the composition is substantially free from salts of the weakly anionic herbicide and the hard water cations (e.g., less than 5, 2, 1, 0.5, 0.2, or 0.1 wt. % of the weakly anionic herbicide in the composition is in salt form with the hard water cations; at least 95, 98, 99, 99.5, 99.8, or 99.9 wt. % of the weakly anionic herbicide in the composition is in a form other than a salt with the hard water cations). In a further refinement, the hard water cations are in the form of a metal complex with the aminopolycarboxylate salt (e.g., hard water cations are chelated with the aminopolycarboxylate salt water conditioner; some or all of the hard water cations are in the metal complex form; some hard water cations may be free in the aqueous matrix).

In another refinement, the composition further comprises a monosaccharide (e.g., fructose, glucose, and mannose, in particular including fructose alone or in combination with glucose such as in high-fructose corn syrup; the monosaccharide is present in the composition in an amount ranging from 0.1 wt. % to 10 wt. % (e.g., 0.5 wt. % to 5 wt. % or 0.7 wt. % to 3 wt. %)).

In another refinement, the composition further comprises one or more additives selected from the group consisting of other water conditioners (e.g., other than aminopolycarboxylate salts, such as ammonium sulfate, ammonium nitrate, citric acid and/or a salt thereof), surfactants (e.g., nonionic, anionic, cationic), antifoaming agents (e.g., siloxanes such as polydimethylsiloxane), and anti-drift agents (e.g., polyvinyl polymers such as polyacrylamide). The additives can be included in any suitable amount, for example in an amount ranging from 0.01 wt. % to 10 wt. % (e.g., 0.1 wt. % to 5 wt. %).

In another refinement, the aminopolycarboxylate salt, the volatile growth regulator herbicide, and the glyphosate herbicide are present in the composition at concentrations suitable for application to a target area comprising an undesired plant which is to be targeted by the volatile growth regulator herbicide and the glyphosate herbicide, and which is sensitive to the volatile growth regulator herbicide and the glyphosate herbicide. The concentrations of the volatile growth regulator herbicide and/or the glyphosate herbicide can include component amounts in the acid form as well as in any/all of the various derivative forms (e.g., salts, esters, amides, or otherwise).

In another refinement, the aminopolycarboxylate salt, the volatile growth regulator herbicide, and the glyphosate herbicide are present in the composition at elevated concentrations unsuitable without prior dilution for application to a target area comprising an undesired plant which is to be targeted by the volatile growth regulator herbicide and the glyphosate herbicide, and which is sensitive to the volatile growth regulator herbicide and the glyphosate herbicide. The concentrations of the volatile growth regulator herbicide and/or the glyphosate herbicide can include component amounts in the acid form as well as in any/all of the various derivative forms (e.g., salts, esters, amides, or otherwise).

In another aspect, the disclosure relates to a method for controlling undesired plants, the method comprising: (a) providing a composition according to according to any of the various embodiments; (b) applying the composition to a target area comprising: (i) optionally a first desired plant which is resistant or tolerant to the volatile growth regulator herbicide and the glyphosate herbicide (when present), and (ii) an undesired plant which is to be targeted by the volatile growth regulator herbicide and the glyphosate herbicide (when present), and which is sensitive to the volatile growth regulator herbicide and the glyphosate herbicide (when present); and (c) controlling the undesired plant in the target area with the applied composition. The volatility of the volatile growth regulator herbicide in the target area can be reduced or eliminated relative to a corresponding composition without the aminopolycarboxylate salt applied to the target area. The target area can include plant substrates (e.g., first desired plants, second desired plants, undesired plants) and/or soil to which the composition is applied, and herbicide volatility can be reduced from either or both of the plant substrates and the soil (e.g., where the herbicide can have different degrees of volatility from different plant substrates and/or soil).

Various refinements of the disclosed method are possible.

In a refinement, the target area comprises the first desired plant which is resistant or tolerant to the volatile growth regulator herbicide and the glyphosate herbicide (when present).

In another refinement, the undesired plant to be targeted comprises at least one of broadleaf weeds and grasses.

In another refinement, the target area is adjacent to a collateral area comprising a second desired plant which is to be protected from the volatile growth regulator herbicide and/or the glyphosate herbicide (when present), and which is sensitive to the volatile growth regulator herbicide and/or the glyphosate herbicide (when present). Damage to the second desired plant in the collateral area can be reduced or eliminated relative to a corresponding composition without the aminopolycarboxylate salt applied to the target area.

While the disclosed methods and compositions are susceptible of embodiments in various forms, specific embodiments of the disclosure are illustrated (and will hereafter be described) with the understanding that the disclosure is intended to be illustrative, and is not intended to limit the claims to the specific embodiments described and illustrated herein.

DETAILED DESCRIPTION

The disclosure relates to adjuvant- and herbicide-containing compositions (alternatively referenced as herbicide compositions) and related methods for reducing herbicide volatility. The herbicide composition includes a volatile growth regulator herbicide (e.g., 2,4-D and derivatives or analogs thereof), an aminopolycarboxylate salt water conditioner (e.g., salts of diethylenetriaminepentaacetic acid (DTPA), ethylenediaminetetraacetic acid (EDTA)), and optionally a glyphosate herbicide (e.g., N-(phosphonomethyl)glycine, including salts and esters thereof). The compositions generally have a mildly acidic to mildly basic pH value (e.g., pH value of at least about 4.5 or 5), which can allow the water conditioner to remain active as a chelator in salt form (e.g., as compared to an acid form). The composition can be applied to a target area to control an (undesired) herbicide-sensitive target plant in the area with the herbicide. The presence of the aminopolycarboxylate salt water conditioner can both potentiate the herbicide as well as reduce volatile transport of the herbicide. Reduced volatile transport of the herbicide can reduce damage to other (desired) non-target herbicide-sensitive plants, whether inside or outside of the target area of application. Suitably, the herbicide composition including the aminopolycarboxylate salt water conditioner can result in a reduced injury level at 7-DAT, 10-DAT, 14-DAT, and/or 21-DAT to desired, non-target herbicide-sensitive plants (e.g., based on reduced volatile transport of the herbicide) which is about 80%, 50% or 30% or less and/or at least about 5%, 10%, 20%, 30%, or 40% of the injury level for a corresponding herbicide composition without the aminopolycarboxylate salt water conditioner. Alternatively or additionally, the herbicide composition including the aminopolycarboxylate salt water conditioner can result in an increased injury level at 7-DAT, 10-DAT, 14-DAT, and/or 21-DAT to undesired, target herbicide-sensitive plants (e.g., based on potentiation of the herbicide) which is up to about 500%, 200%, or 150% and/or at least about 105%, 110%, 120%, 130%, or 140% of the injury level for a corresponding herbicide composition without the aminopolycarboxylate salt water conditioner.

The appearance of glyphosate-resistant weeds in farmers' fields has created a problem and a need for a solution. A possible solution is the application of the combination of glyphosate with a growth regulator herbicide such as dicamba or 2,4-D. Growth regulator herbicides are usually formulated as salts or esters. These exhibit various degrees of volatility. The vapors may move off site and injure sensitive plants. The parent herbicide is acid which may be more or less volatile than the salts or the ester.

The volatility problem can be addressed several ways. Formulating salts of the growth regulator herbicides may contribute to the solution. Adjuvants in the spray solution that facilitate increased herbicide activity may also contribute to the solution. Water conditioners can increase the activity of glyphosate, dicamba, and 2,4-D. However, the common diammonium sulfate water conditioner results in the formation of an ammonium salt of the herbicide, which can be more volatile than the preferred lower volatility salt. Chelate water conditioners on the market lower the pH of an aqueous herbicide composition because they are acids. At pH values below about 5.0 the salt can disassociate to the more volatile acid, at least for dicamba. Lower application rates of the herbicide can reduce volatility.

A solution to the aforementioned dilemma is the use of a water conditioner chelate that is active at pH values of 5.0 and above. Diethylenetriaminepentaacetic acid (DTPA) can be prepared as either the sodium or potassium salt and remain active as a chelator to meet the need of preventing the formation of the calcium, magnesium, iron, and/or aluminum salts of the herbicide (e.g., salts formed from metal/mineral ions commonly found in water, such as hard water used for the aqueous herbicide composition). Thus, the desired low volatile salt of herbicide can be protected and the application rate applied to gain the benefits of reduced dosage. Salts (e.g., sodium or potassium salts) of ethylenediaminetetraacetic acid (EDTA) are similarly useful as active chelators at pH values of 5.0. In some cases, the DTPA may be preferably over the EDTA salt, as the EDTA salt has six binding sets versus eight binding sets for the DTPA salt. The DTPA and/or EDTA salts can be used with other herbicides or pesticides that may need to be applied at values of 5.0 or above and/or benefit from the presence of a water conditioner.

In an aspect, the disclosure relates to an adjuvant/herbicide composition including water, an aminopolycarboxylate salt water conditioner, and one or more of a volatile growth regulator herbicide, a glyphosate herbicide, and a weakly anionic herbicide. Examples of suitable aminopolycarboxylate salt water conditioners include metal-chelating salts of diethylenetriaminepentaacetic acid (DTPA) and/or ethylenediaminetetraacetic acid (EDTA), among others. Examples of suitable volatile growth regulator herbicides include 2,4-D and/or dicamba, including derivatives or analogs thereof, among others. Examples of suitable glyphosate herbicides include N-(phosphonomethyl)glycine, including salts, derivatives, or analogs thereof. Examples of suitable weakly anionic herbicides include glufosinate and/or bentazon, including derivatives or analogs thereof, among others. The composition has a pH value of at least 4.5. Suitably, the composition has a pH value in a range from 4.5 to 10 (e.g., at least 4.5, 4.8, 5, 5.5, 6, 6.5 or 7 and/or up to 7, 7.5, 8, 9, or 10), such as pH of 4.5 to 7.5 or 5 to 7).

The aminopolycarboxylate salt generally includes at least one amino group (e.g., primary, secondary, or tertiary), two or more carboxylate/carboxylic groups, and optionally one or more hydrocarbon (e.g., alkylene) linking groups between the amino and carboxylate/carboxylic groups. Examples of suitable aminopolycarboxylate salts include metal salts of an aminopolycarboxylic acid such as diethylenetriaminepentaacetic acid (DTPA), ethylenediaminetetraacetic acid (EDTA), hydroxyethylethylenediaminetriacetic acid (HEDTA), nitrilotriacetic acid (NTA), or iminodiacetic acid (IDA). For example, the aminopolycarboxylate salt can include partial or complete metal salts of the foregoing aminopolycarboxylic acids (e.g., some or all of the carboxylic acid functional groups are in metal carboxylate form, while others can be in acid form accordingly), depending on the resulting pH properties of the aminopolycarboxylate salt and the composition as a whole in view of the minimum pH value for the composition. The composition is generally free from corresponding aminopolycarboxylic acids in complete acid form. The aminopolycarboxylate salt has at least 1 amino group and at least 2 carboxylate/carboxylic groups for a total of at least 3 metal-binding groups for metal complex formation/chelation. Preferably, the aminopolycarboxylate salt has at least 5, 6, 7 or 8 and/or up to 7, 8, or 10 metal-binding groups (e.g., including amino groups and carboxylate/carboxylic groups combined). In an embodiment, the aminopolycarboxylate salt can be an alkali metal salt of the aminopolycarboxylic acid (e.g., sodium salt and/or potassium salt).

The specific amount of the aminopolycarboxylate salt in the adjuvant/herbicide composition is not particularly limited. Suitably, the aminopolycarboxylate salt is present in the composition in an amount ranging from 0.1 wt. % to 10 wt. % (e.g., 0.5 wt. % to 5 wt. % or 0.7 wt. % to 3 wt. %). In various embodiments, the aminopolycarboxylate salt is present in an amount of at least about 0.1 wt. %, 0.2 wt. %, 0.5 wt. %, 0.7 wt. %, or 1 wt. % and/or up to about 1.5 wt. %, 2 wt. %, 3 wt. %, 5 wt. % or 10 wt. % relative the composition as a whole. The foregoing amounts can apply to aminopolycarboxylate salt species individually or all aminopolycarboxylate salt species collectively present.

Volatile growth regulator herbicides often function in a manner similar to plant growth regulators or hormones, and they can operate to induce uncontrolled or unsustainable growth to damage and/or kill plants sensitive to the herbicide. Common volatile growth regulator herbicides include phenoxy herbicides (e.g., organochlorine phenoxy herbicides) such as phenoxy-acetic acids, phenoxy-butyric acids, derivatives thereof, and combinations thereof. A volatile growth regulator herbicide can include a weak acid herbicide or a derivative thereof (e.g., including a weak acid group such as a carboxylic acid group such as an acetic acid or a butyric acid group). The herbicide can be in its acid form, in a derivative form, or in a combination of multiple forms (e.g., multiple forms added to the aqueous herbicide composition or multiple forms resulting from chemical equilibria in aqueous herbicide composition). Example herbicide derivative forms include salts (e.g., metal salt such as alkali and/or alkali earth metal salt; amine salt such as mono-, di-, or tri-alkyl or alkanol amine ($C_1$, $C_2$, $C_3$ or $C_4$ alkyl/alkanol groups such as methyl/methanol, ethyl/ethanol, isopropyl/isopropanol such as in dimethylamine, diethanolamine, isopropylamine, triisopropanolamine salts); organic salt such as choline (e.g., including alkyl, alkanol, and amine/ammonium groups)), esters (e.g., alkyl esters ($C_1$ or $C_3$ to $C_8$ or $C_{12}$ alkyl groups such as isopropyl, ethylhexyl), and amides. As noted, the specific form of the herbicide and its derivatives can relate to the form as supplied to or the form as present in the aqueous herbicide composition resulting from the various equilibrium reactions with the herbicide as supplied, (ionic) species in the water used (e.g., $Ca^{2+}$ and/or $Mg^{2+}$ in hard water), (ionic) species added to the herbicide composition (e.g., water conditioners, surfactants), and pH conditions of the herbicide composition (e.g., commonly pH from 2 to 7.5 or 4.5 to 7.5). Additionally or alternatively, the herbicide can include an aromatic and/or a heteroaromatic group (e.g., benzene- or pyridine-based group as characteristic of common plant hormone-type herbicides, such as the phenoxy family of herbicides, in particular organochlorine phenoxy herbicides).

Examples of suitable volatile growth regulator herbicides include 2,4-dichlorophenoxyacetic acid (2,4-D), 2,4,5-trichlorophenoxyacetic acid (2,4,5-T), 2-methyl-4-chlorophenoxyacetic acid (MCPA), 2-(2-methyl-4-chlorophenoxy)propionic acid (mecoprop, MCPP), 4-(4-chloro-o-tolyloxy) butyric acid (MCPB), 2-(2,4-dichlorophenoxy)propionic acid (dichlorprop, 2,4-DP), (2,4-dichlorophenoxy)butyric acid (2,4-DB), 3,6-dichloro-2-methoxybenzoic acid (dicamba), 4-amino-3,5,6-trichloropicolinic acid (picloram), 3,5,6-trichloro-2-pyridinyloxyacetic acid (triclopyr), 3,6-dichloro-2-pyridinecarboxylic acid (clopyralid), derivatives thereof, and combinations thereof. In some embodiments, the herbicide composition can include more than one type of volatile growth regulator herbicide (e.g., two, three, or four different types of volatile growth regulator herbicides in admixture). In other embodiments, the herbicide composition includes only one type of volatile growth regulator herbicide (e.g., a single type but possibly including one or more of an acid, salt, and ester form of the herbicide type). In a particular embodiment, 2,4-D and derivatives thereof are the only volatile growth regulator herbicides in the herbicide composition.

The volatility of the volatile growth regulator herbicide can be characterized in terms of its vapor pressure in the aqueous herbicide composition (e.g., in the form as present in the composition, if different from the form as added the composition). The vapor pressure of the herbicide can be at least $1 \times 10^{-6}$ Pa, $1 \times 10^{-5}$ Pa, $1.3 \times 10^{-5}$ Pa, $1.5 \times 10^{-5}$ Pa, $1.8 \times 10^{-5}$ Pa, $1 \times 10^{-4}$ Pa, or $1 \times 10^{-3}$ Pa and/or up to $1 \times 10^{-4}$ Pa, $1 \times 10^{-3}$ Pa, $1 \times 10^{-2}$ Pa, $1 \times 10^{-1}$ Pa, $1 \times 10^{0}$ Pa, or $1 \times 10^{1}$ Pa. By way of illustration, approximate vapor pressures of common forms of 2,4-D include $1.9 \times 10^{-5}$ Pa (acid), $1.3 \times 10^{-5}$ Pa (dimethylamine salt), $3.2 \times 10^{-4}$ Pa (butoxyethyl ester), $4.8 \times 10^{-4}$ Pa (2-ethylhexyl ester), and $1.9 \times 10^{1}$ Pa (isopropyl ester). Other common forms of 2,4-D that can form the corresponding volatile acid in an aqueous solution include metal salts (e.g., alkali and alkali metal salts such as the sodium salt), the isopropylamine salt, and the triisopropanolamine salt.

The specific amount of the volatile growth regulator herbicide in the adjuvant/herbicide composition is not particularly limited, for example generally being guided by herbicide manufacturer-recommended application rates and the intended target plant. Suitably, the volatile growth regulator herbicide is present in the composition in an amount ranging from 0.01 wt. % to 10 wt. % (e.g., 0.1 wt. % to 5 wt. %). In various embodiments, the volatile growth regulator herbicide is present in an amount of at least about 0.01 wt. %, 0.1 wt. %, 0.2 wt. %, 0.5 wt. %, 0.7 wt. %, or 1 wt. % and/or up to about 1.5 wt. %, 2 wt. %, 3 wt. %, 5 wt. % or 10 wt. % relative the composition as a whole. The foregoing amounts can apply to volatile growth regulator herbicide species individually or all volatile growth regulator herbicide species collectively present (e.g., multiple forms of the same type of herbicide and/or multiple types of different herbicides).

In some embodiments, the adjuvant/herbicide composition alternatively or additionally can include an herbicide which is not a volatile growth regulator herbicide. For example, the composition can include one or more non-volatile growth regulator herbicides (e.g., non-volatile herbicides and/or non-growth regulator herbicides) such as an amino acid derivative herbicide, a weakly anionic herbicide, and others disclosed in U.S. Pat. No. 5,945,377, incorporated herein by reference in its entirety. In an embodiment, the additional herbicide can include an amino acid derivative herbicide, for example a glyphosate herbicide (e.g., N-(phosphonomethyl)glycine (glyphosate) including various salts and other derivatives thereof). In an embodiment, the additional herbicide can include a weakly anionic herbicide. In an embodiment, the herbicide composition can be free of non-volatile growth regulator herbicides.

In some embodiments, the adjuvant/herbicide composition includes the glyphosate herbicide. The glyphosate herbicide can include one or more of glyphosate (N-(phosphonomethyl)glycine), salts thereof, and esters thereof, for example including isopropylamine, diammonium, monoammonium, or potassium salts in particular or any of the other derivatives described herein for volatile growth regulator herbicides. The specific amount of the glyphosate herbicide in the adjuvant/herbicide composition is not particularly limited, for example generally being guided by herbicide manufacturer-recommended application rates and the intended target plant. Suitably, the glyphosate herbicide is present in the composition in an amount ranging from 0.01 wt. % to 10 wt. % (e.g., 0.1 wt. % to 5 wt. %). In various embodiments, the glyphosate herbicide is present in an amount of at least about 0.01 wt. %, 0.1 wt. %, 0.2 wt. %, 0.5 wt. %, 0.7 wt. %, or 1 wt. % and/or up to about 1.5 wt. %, 2 wt. %, 3 wt. %, 5 wt. % or 10 wt. % relative the composition as a whole. The foregoing amounts can apply to glyphosate herbicide species individually or all glyphosate herbicide species collectively present (e.g., multiple forms of the same type of herbicide and/or multiple types of different herbicides).

In some embodiments, the adjuvant/herbicide composition includes the weakly anionic herbicide. The weakly anionic herbicide can include one or more of glufosinate, bentazon, salts thereof, and esters thereof, for example including ammonium, sodium, or potassium salts in particular or any of the other derivatives described herein for volatile growth regulator herbicides. The specific amount of the weakly anionic herbicide in the adjuvant/herbicide composition is not particularly limited, for example generally being guided by herbicide manufacturer-recommended application rates and the intended target plant. Suitably, the weakly anionic herbicide is present in the composition in an amount ranging from 0.01 wt. % to 10 wt. % (e.g., 0.1 wt. % to 5 wt. %). In various embodiments, the weakly anionic herbicide is present in an amount of at least about 0.01 wt. %, 0.1 wt. %, 0.2 wt. %, 0.5 wt. %, 0.7 wt. %, or 1 wt. % and/or up to about 1.5 wt. %, 2 wt. %, 3 wt. %, 5 wt. % or 10 wt. % relative the composition as a whole. The foregoing amounts can apply to weakly anionic herbicide species individually or all weakly anionic herbicide species collectively present (e.g., multiple forms of the same type of herbicide and/or multiple types of different herbicides).

In some embodiments, the adjuvant/herbicide composition can be in the form of a spray solution and may contain one or more hard water cations, for example as a result of being mixed or diluted with hard water. Hard water cations generally include metal ions characteristic of hard water used for herbicidal composition formulation, for example including one or more of $Ca^{2+}$ ions, $Mg^{2+}$ ions, $Fe^{2+}$ ions, $Fe^{3+}$ ions, and $Al^{3+}$ ions. In an embodiment, the composition includes the volatile growth regulator herbicide, and the composition is substantially free from salts of volatile growth regulator herbicide and the hard water cations, such as where less than 5, 2, 1, 0.5, 0.2, or 0.1 wt. % of the volatile growth regulator herbicide in the composition is in salt form with the hard water cations, and/or at least 95, 98, 99, 99.5, 99.8, or 99.9 wt. % of the volatile growth regulator herbicide in the composition is in a form other than a salt with the hard water cations. Metal salts of the hard water cations and the weak acid volatile growth regulator herbicide can be more volatile than the form of the volatile growth regulator herbicide as provided to the composition, so the formation of such salts is preferably avoided/prevented/reduced with the aminopolycarboxylate salt water conditioner. Even when the composition does not contain hard water cations as provided, the composition remains substantially free from such salts of the herbicide when exposed to hard water cations from another source such as in the environment or when diluted with hard water. In an embodiment, the composition includes the glyphosate herbicide, and the composition is substantially free from salts of the glyphosate herbicide and the hard water cations, such as where less than 5, 2, 1, 0.5, 0.2, or 0.1 wt. % of the glyphosate herbicide in the composition is in salt form with the hard water cations, and/or at least 95, 98, 99, 99.5, 99.8, or 99.9 wt. % of the glyphosate herbicide in the composition is in a form other than a salt with the hard water cations. In an embodiment, the composition includes the weakly anionic herbicide, and the composition is substantially free from salts of the weakly anionic herbicide and the hard water cations, such as where less than 5, 2, 1, 0.5, 0.2, or 0.1 wt. % of the weakly anionic herbicide in the composition is in salt form with the hard water cations, and/or at least 95, 98, 99, 99.5, 99.8, or 99.9 wt. % of the weakly anionic herbicide in the composition is in a form other than a salt with the hard water cations. In an embodiment, the hard water cations are in the form of a metal complex with the aminopolycarboxylate salt, such as where the hard water cations are chelated with the aminopolycarboxylate salt water conditioner. Some or all of the hard water cations can be in the metal complex form, and/or some or no hard water cations may be free in the aqueous matrix.

In some embodiments, the adjuvant/herbicide composition can include a monosaccharide. The monosaccharide suitably includes one or more of fructose, glucose, and mannose, in particular including fructose alone or in combination with glucose. In some embodiments, fructose or fructose and glucose is/are the only monosaccharide(s) (or saccharide(s) more generally) in the composition (e.g., the composition is free from other (added) monosaccharides or saccharides more generally). Alternatively or additionally, the monosaccharide can include a corn syrup product such as high-fructose corn syrup. High-fructose corn syrup (HFCS) suitably includes at least 40 wt. %, 50 wt. %, or 60 wt. % and/or up to 50 wt. %, 60 wt. %, 70 wt. % or 90 wt. % fructose relative to total monosaccharides (e.g., balance glucose) in the syrup. Examples include HFCS 42/58, 55/45, or 90/10 or blends thereof (e.g., about 20 wt. %, 25 wt. %, or 30 wt. % water with the substantial balance being a combination of fructose and glucose in the indicated w/w ratio). For example, the ratio of fructose/glucose (w/w) can be 40/60 to 45/55, 40/60 to 60/40, 50/50 to 60/40, 40/60 to 90/10, about 42/58, about 55/45, or about 90/10. In some embodiments, where the high-fructose corn syrup is the only source of monosaccharides or saccharides in the herbicide composition. In other embodiments, the adjuvant/herbicide composition is free or substantially free from saccharides other than the monosaccharide (e.g., free from disaccharides such as sucrose, free from other oligosaccharides (such as 3-10 saccharide units), free from other polysaccharides (such as more than 10 saccharide units), such as having no added saccharides of the indicated type).

The specific amount of the monosaccharide in the adjuvant/herbicide composition is not particularly limited. Suitably, the monosaccharide is present in the composition in an amount ranging from 0.1 wt. % to 10 wt. % (e.g., 0.5 wt. % to 5 wt. % or 0.7 wt. % to 3 wt. %). In various embodiments, the monosaccharide is present in an amount of at least about 0.1 wt. %, 0.2 wt. %, 0.5 wt. %, 0.7 wt. %, or 1 wt. % and/or up to about 1.5 wt. %, 2 wt. %, 3 wt. %, 5 wt. % or 10 wt. % relative the composition as a whole. The foregoing amounts can apply to monosaccharide species individually or all monosaccharide species collectively present (e.g., fructose and glucose combined).

The adjuvant/herbicide composition additional can contain one or more additives or adjuvants known in the art and at commonly employed levels for the same. For example, the composition can include one or more water conditioners (e.g., other than aminopolycarboxylate salts, such as ammonium sulfate and/or ammonium nitrate for hard water management), one or more surfactants (e.g., nonionic, anionic, cationic), one or more antifoaming agents (e.g., siloxanes such as polydimethylsiloxane), one or more anti-drift agents (e.g., polyvinyl polymers such as polyacylamide), etc. The additives can be included in any suitable amount, for example in an amount ranging from 0.01 wt. % to 10 wt. % (e.g., 0.1 wt. % to 5 wt. %).

In another aspect, the disclosure relates to a method for controlling undesired plants. The method includes: (a) providing an adjuvant/herbicide composition according to according to any of the various embodiments, (b) applying the composition to a target area, and (c) controlling the undesired plant in the target area with the applied composition. The target area to which the composition is applied includes an undesired plant which is to be targeted by the volatile growth regulator herbicide and the glyphosate herbicide (when present), and which is sensitive to the volatile growth regulator herbicide and the glyphosate herbicide (when present). The target area to which the composition is applied optionally can include a first desired plant which is resistant or tolerant to the volatile growth regulator herbicide and the glyphosate herbicide (when present). The volatility of the volatile growth regulator herbicide in the target area can be reduced or eliminated relative to a corresponding composition without the aminopolycarboxylate salt applied to the target area. The target area can include plant substrates (e.g., first desired plants, second desired plants, undesired plants) and/or soil to which the composition is applied, and herbicide volatility can be reduced from either or both of the plant substrates and the soil (e.g., where the herbicide can have different degrees of volatility from different plant substrates and/or soil).

Reduction in herbicide volatility can be characterized using the procedure generally set forth in Penner U.S. Publication No. 2016/0255832, which includes a bioassay system for evaluating herbicide volatilization from plant substrates (e.g., using wheat and soybean plants or equivalent in a plant growth chamber with a selected adjuvant/herbicide composition including a volatile growth regulator herbicide and an aminopolycarboxylate salt). A wide range of soil, plant, environmental, and herbicide factors (e.g., vapor pressure and water solubility of herbicide, surface characteristics) can affect herbicide volatility from soils and plants. Comparison of the volatilization would be most readily visualized by appropriate bioassay systems. In the bioassay system, a herbicide composition including a volatile growth regulator herbicide (e.g., 2,4-D, dicamba, or otherwise) and optionally one or more adjuvants (e.g., including an aminopolycarboxylate salt or not) is applied foliarly to a target plant generally resistant to the herbicide (e.g., wheat plants, such as amber red wheat) or is applied to a target soil area without a target plant. Twenty minutes later, soybean plants (e.g., PIONEER 92M92 soybean plants) or other plants sensitive to the volatile growth regulator herbicide are placed in the middle of the sprayed target plants and/or soil. Visual evaluation of the herbicide-sensitive plants 1 to 3 weeks later showed differences in plant injury resulting from the applied herbicide composition and the volatility of the herbicide component thereof.

The adjuvant/herbicide composition is often provided as a concentrate which is diluted with water (usually hard water) in the field prior to application to a target area. The diluted composition provides sufficient herbicide to kill or otherwise control the undesired plants in the target area. The application rate of the herbicide can vary as appropriate for a particular herbicide and a particular target plant, but common rates range from about 0.01 kg a.i./ha to 4.0 kg a.i./ha, commonly applied (e.g., sprayed with a sprayer) at rates of about 40 L/ha to 300 L/ha of the dilute composition, with some undesired plants requiring more herbicide than others.

The undesired plant in the target area is not particularly limited and can include any plant which is sensitive to the herbicide and which is desired to be killed, damaged, or otherwise controlled by the application of the herbicide. Sensitive plants generally include any plants susceptible to being killed, damaged, or otherwise controlled by the herbicide, regardless of whether the plants are natural varieties (e.g., naturally occurring wild type varieties, varieties bred for a particular trait) or genetically modified varieties to incorporate (heterologous) genetic traits related to something other than resistance to the herbicide. The undesired plant suitably can include one or more types of broadleaf weeds and/or grasses in the target area. Example broadleaf weeds include marestail, velvetleaf, and common lambsquarters. These examples are illustrative and the herbicide composition more generally can be used to control any undesired herbicide-sensitive plant.

In some embodiments, the target area also includes planted therein one or more first desired plants which are resistant or tolerant to the herbicide. The first desired plant can represent a crop plant or other valuable plant in a field or other cultivated area where it is desired to eliminate of the undesired plant (e.g., where the undesired plant has an adverse effect on the first desired plants and/or the undesired plant is aesthetically displeasing). In this case, the adjuvant/herbicide composition can be applied to the target area to control the undesired plant without substantially adversely affecting the first desired plant (e.g., due to its resistance or tolerance to the volatile growth regulator herbicide). Resistant or tolerant plants include those plants which are generally not susceptible to control by the volatile growth regulator herbicide, for example as a result of one or more naturally occurring resistance or tolerance traits (e.g., traits in naturally occurring wild type varieties or natural varieties bred for a particular trait, whether or not related to herbicide resistance) and/or one or more (heterologous) genetic traits conferring herbicide resistance in a genetically modified plant. Examples of resistant or tolerant plants (e.g., as the first plant) include resistant cash crops (e.g., resistant soybean, resistant corn, resistant canola, resistant cotton, resistant wheat; whether or not resistance results from a genetically modified trait, natural trait, or bred trait), tolerant cash crops (e.g., wheat; whether or not tolerance results from a genetically modified trait, natural trait, or bred trait), resistant or tolerant grasses such as turfgrasses (e.g., whether or not tolerance or resistance results from a genetically modified trait, natural trait, or bred trait). These examples are illustrative and the target area more generally can include any desired herbicide-resistant or herbicide-tolerant plants.

In an embodiment, the target area is adjacent to a collateral area that includes planted therein one or more second desired plants which are to be protected from a volatile growth regulator herbicide in the adjuvant/herbicide composition and which are sensitive to the volatile growth regulator herbicide. The second desired plant can represent a crop plant or other valuable plant in a field or other cultivated area which is adjacent to the target area where it is desired to eliminate the undesired plant. The proximity between the target area and the collateral area is not particularly limited. In some cases, the target area and the collateral area can be about 1 m or less, 10 m or less, 100 m or less, 1 km or less, or 10 km or less from each other, for example within about 1 m to 10 m, 10 m to 100 m, 100 m to 1 km, or 1 km to 10 km of each other (e.g., within about 1 m, 10 m, 100 m, 1 km, or 10 km of each other). Because the volatility of the volatile growth regulator herbicide as applied to the target area is reduced or eliminated, damage to the second desired plant in the collateral area is similarly reduced or eliminated based on a suppression of volatile transport of the herbicide to the collateral area. For example, damage to the second desired plant is reduced relative that which would otherwise be observed resulting from to a corresponding herbicide composition without the monosaccharide applied to the target area (e.g., not more than 50%, 20%, 10%, 5%, 2% or 1% damage relative to the corresponding control herbicide composition; in cases where some minor volatilization can still occur, the relative damage could be at least 0.5%, 1%, 2%, 5% or 10% and less than one of the previous upper bounds). Sensitive second desired plants in the collateral area generally include cash crops, ornamental plants, and wild plant life (e.g., varieties without any natural, bred, or transgenically introduced resistance or tolerance). Examples of sensitive second desired plants include soybean plants, corn plants, sugar beet plants, tomato plants, cucumber plants, grape plants, cotton plants, melon plants, dry bean plants, potato plants, fruit plants (e.g., trees or bushes such as for cherry trees, apple trees, orange trees), and ornamental plants (e.g., flowers or otherwise). These examples are illustrative and the collateral area more generally can include any desired herbicide-sensitive plants.

The specific manner in which the undesired plant in the target area is controlled by the herbicide is not particularly limited. Control of the undesired plant generally corresponds to the intended herbicidal activity for the undesired plant, for example one or more of killing and/or damaging of the undesired plant, preventing further reproduction and/or growth of the undesired plant, etc. Conversely, the herbicide-sensitive desired plants, when present in the target or adjacent collateral areas, respectively, suitably are not substantially adversely affected or otherwise controlled by the herbicide (e.g., killed, damaged or injured) due to a reduction in or elimination of volatile transport of the herbicide from its area or substrate of application.

Penner U.S. Publication No. 2016/0255832 is attached hereto and incorporated by reference, in particular for its disclosure related to volatile growth regulator herbicides, glyphosate herbicides, herbicide composition additives other than the aminopolycarboxylate salt water conditioner, methods of using reduced-volatility herbicide compositions to control undesired plants while preventing or reducing damage to desired plants in or near the target application area, methods for evaluating plant damage and herbicide volatility, etc.

EXAMPLES

The following examples illustrate the disclosed compositions and methods, but are not intended to limit the scope of any claims thereto. Tables 1-4 below provide experimental results illustrating the effect of aminopolycarboxylate salt water conditioners according to the disclosure as well as other comparative adjuvants on the efficacy and volatility of herbicides according to the disclosure, including dicamba and glyphosate. Briefly, Tables 1-3 illustrate the ability of aminopolycarboxylate salt water conditioners (as illustrated by DTPA and EDTA salts) to improve the efficacy of herbicides (as illustrated by glyphosate) against weeds (as illustrated by giant foxtail and velvetleaf weeds). In the examples of Tables 1-3, target weeds were initially treated with glyphosate and any additional adjuvants as indicated in the tables. The weeds were then grown in a controlled environment, and desirable control (e.g., death/damage) of the weed plants was observed and recorded at regular intervals up to 28 days after treatment (DAT). Further, Table 4 illustrates the ability of aminopolycarboxylate salt water conditioners (as illustrated by DTPA salts) to reduce volatility of volatile herbicides (as illustrated by dicamba) and to correspondingly reduce damage from volatile herbicides to sensitive plants (as illustrated by tomato plants). In the examples of Table 4, target soil was initially treated with dicamba and any additional adjuvants as indicated in the table, and then tomato plants were inserted into a ring of the treated soil for 24 hours. After 24 hours of sitting in the treated soil (i.e., during which time any volatilized herbicide from the soil could contact the tomato plants), the tomato plants were removed from the treated soil and grown on a laboratory bench. Undesirable injury to the tomato plants was observed and recorded at regular intervals up to 28 days after treatment (DAT).

TABLE 1

EFFECT of DTPA on GLYPHOSATE EFFICACY - GIANT FOXTAIL -
COMBINED DATA - EXPERIMENTS 1 and 2 - 10 gpa and 25 psi

| TRT NO. | TREATMENT | % CONTROL 7 DAT | % CONTROL 10 DAT | % CONTROL 14 DAT | % CONTROL 21 DAT |
|---|---|---|---|---|---|
| 1 | UNTREATED CHECK | 0 e | 0 e | 0 e | 0 f |
| 2 | GLYPHOSATE* | 39 cd | 37 d | 40 cd | 34 de |
| 3 | GLYPHOSATE + 1% v/v NTANK** | 50 ab | 55 abc | 66 ab | 65 b |
| 4 | GLYPHOSATE + 2% w/v AMS | 53 a | 57 ab | 61 b | 67 b |
| 5 | GLYPHOSATE + 0.5% w/v DTPA+ | 43 abcd | 44 bcd | 54 bc | 49 cd |
| 6 | GLYPHOSATE + 1.0% w/v DTPA | 49 abc | 63 a | 78 a | 84 a |
| 7 | GLYPHOSATE + 1.5% w/v DTPA | 42 bcd | 54 abc | 63 b | 68 b |
| 8 | GLYPHOSATE + 2.0% w/v DTPA | 48 abc | 57 ab | 68 ab | 69 b |
| 9 | GLYPHOSATE + 1% v/v ACT 90‡ | 35 d | 40 cd | 37 d | 30 e |
| 10 | GLYPHOSATE + 1.0% w/v DTPA + 1% v/v ACT 90 | 41 bcd | 47 bcd | 60 b | 56 bc |
| 11 | 1.0% w/v DPTA | 1 e | 5 e | 6 e | 1 f |
|  | LSD (0.05) | 11 | 17 | 15 | 16 |

*Glyphosate applied as ROUNDUP POWERMAX at 0.20 lb. a.e./A for Run 1 and 0.25 lb. a.e./A for Run 2 due to larger plant size
**NTANK applied as NTank (AX 14-26) - 2014
+DTPA is Diethylenetriaminepentaacetic acid ≥99% by titration
‡ACT 90 is ACTIVATOR 90 a product of Loveland Industries
+ Adjust pH to 5.5 using KOH (5N)
NOTE:
4 reps experiment 1, 3 reps experiment 2

TABLE 2

EFFECT of DTPA, EDTA, KOH on GLYPHOSATE EFFICACY on GIANT FOXTAIL -
COMBINED DATA - EXPERIMENT 1 and 2 - 10 gpa and 25 psi

| TRT NO. | TREATMENT | % CONTROL 7 DAT | % CONTROL 10 DAT | % CONTROL 14 DAT | % CONTROL 21 DAT |
|---|---|---|---|---|---|
| 1 | UNTREATED CHECK | 0 f | 0 d | 0 d | 0 f |
| 2 | 1.0% w/v DTPA+ | 0 f | 0 d | 0 d | 3 f |
| 3 | 2.0% w/v DTPA | 0 f | 3 d | 0 d | 3 f |
| 4 | GLYPHOSATE* | 49 cd | 48 bc | 48 c | 45 e |
| 5 | GLYPHOSATE + 1.0% w/v DTPA pH ~5 | 57 bcd | 63 a | 58 bc | 69 cd |
| 6 | GLYPHOSATE + 2.0% w/v DTPA pH ~5 | 57 bcd | 60 ab | 56 bc | 71 bcd |
| 7 | GLYPHOSATE + 1.0% w/v DTPA pH ~7 | 58 bc | 63 a | 65 ab | 78 abc |
| 8 | GLYPHOSATE + 2.0% w/v DTPA pH ~7 | 65 ab | 68 a | 72 a | 76 abc |
| 9 | GLYPHOSATE + amt KOH w/1.0% DTPA to get pH ~5 | 37 e | 45 c | 47 c | 42 e |
| 10 | GLYPHOSATE + amt KOH w/2.0% DTPA to get pH ~5 | 48 d | 49 bc | 52 c | 49 a |
| 11 | GLYPHOSATE + amt KOH w/1.0% DTPA to get pH ~7 | 48 d | 46 c | 47 c | 43 e |

TABLE 2-continued

EFFECT of DTPA, EDTA, KOH on GLYPHOSATE EFFICACY on GIANT FOXTAIL - COMBINED DATA - EXPERIMENT 1 and 2 - 10 gpa and 25 psi

| TRT NO. | TREATMENT | % CONTROL 7 DAT | % CONTROL 10 DAT | % CONTROL 14 DAT | % CONTROL 21 DAT |
|---|---|---|---|---|---|
| 12 | GLYPHOSATE + amt KOH w/2.0% DTPA to get pH ~7 | 48 d | 48 bc | 58 bc | 64 d |
| 13 | 1.0% w/v EDTA‡ | 0 f | 0 d | 0 d | 3 f |
| 14 | 2 0% w/v EDTA | 0 f | 0 d | 0 d | 0 f |
| 15 | GLYPHOSATE + 1.0% v/v EDTA pH ~5 | 63 ab | 67 a | 67 ab | 82 a |
| 15 | GLYPHOSATE + 2.0% v/v EDTA pH ~5 | 70 a | 70 a | 73 a | 81 ab |
| 17 | GLYPHOSATE + 1 0% v/v EDTA pH ~7 | 59 b | 68 a | 72 a | 78 abc |
| 18 | GLYPHOSATE + 2.0% w/v EDTA pH ~7 | 63 ab | 71 a | 73 a | 85 a |
|  | LSD (0.05) | 9 | 13 | 14 | 10 |

NOTE:
Only three reps due to a limited number of uniform plants
*Glyphosate applied as ROUNDUP POWERMAX at 0.275 lb. for experiment 1 due to larger plant size and 0.20 for experiment 2 a.e./A
†DTPA is Diethylenetriaminepentaacetic acid ≥99% by titration
‡EDTA is Ethylenediaminetetraacetic acid (no salts) 99% pure
+ Adjust pH to 5.5 using KOH (5N)

TABLE 3

EFFECT of DTPA on GLYPHOSATE EFFICACY on VELVETLEAF - COMBINED DATA^^ - EXPERIMENT 1, 2, and 3 - 10 gpa and 25 psi

| TRT NO. | TREATMENT | pH | % CONTROL 7 DAT | % CONTROL 10 DAT | % CONTROL 14 DAT | % CONTROL 21 DAT |
|---|---|---|---|---|---|---|
| 1 | UNTREATED CHECK | 7.8 | 0 f | 0 e | 0 e | 0 f |
| 2 | GLYPHOSATE* | 4.7 | 12 e | 12 d | 10 d | 6 f |
| 3 | GLYPHOSATE + 1% v/v NTANK** | 1.6 | 34 abc | 40 a | 38 b | 40 abc |
| 4 | GLYPHOSATE + 2% w/v AMS | 4.8 | 40 a | 41 a | 46 a | 48 a |
| 5 | GLYPHOSATE + 0.5% w/v DTPA* | 5.3 | 28 cd | 31 b | 33 b | 29 d |
| 6 | GLYPHOSATE + 1.0% w/v DTPA | 5.5 | 30 bcd | 31 b | 33 b | 38 bcd |
| 7 | GLYPHOSATE + 1.5% w/v DTPA | 5.3 | 30 bcd | 36 ab | 36 b | 36 bcd |
| 8 | GLYPHOSATE + 2.0% w/v DTPA | 5.3 | 33 bcd | 38 ab | 37 b | 33 cd |
| 9 | GLYPHOSATE + 1% v/v REDDY-IT‡ | 4.4 | 27 d | 22 c | 23 c | 16 e |
| 10 | GLYPHOSATE + 1.0% w/v DTPA + 1% v/v REDDY-IT | 5.3 | 37 ad | 41 a | 39 ab | 43 ab |
| 11 | 1.0% w/v DPTA |  | 0 f | 0 e | 5 de | 0 f |
|  | LSD (0.05) |  | 7 | 8 | 7 | 9 |

NOTE:
Only three reps Glyphosate applied as ROUNDUP POWERMAX at 0.25 lb. a.e./A
*NTANK applied as NTANK (AX 14-26) available from Adjuvants Plus - 2014
**DTPA is Diethylenetriaminepentaacetic acid ≥99% by titration
†REDDY-IT is a product of Adjuvants Plus - 2013
‡Adjust pH to 5.5 using KOH (5N)
^^Experiment 1 = (16-1), 2 = (16-1AR1), 3 = (16-1AR2)
AMS = diammonium sulfate

TABLE 4

EFFECT of DTPA-Na and MEA on DICAMBA VOLATILITY to TOMATO - EXPERIMENT 1-20 gpa and 25 psi

| TRT NO. | TREATMENT | % INJURY 7 DAT | % INJURY 10 DAT | % INJURY 14 DAT | % INJURY 21 DAT | % INJURY 28 DAT |
|---|---|---|---|---|---|---|
| 1 | CONTROL TAP WATER | 0 i | 0 i | 0 l | 0 m | 0 k |
| 2 | DICAMBA DGA*-duration | 25 cd | 27 cd | 30 c | 27 bcde | 27 abc |
| 3 | DICAMBA + MEA**-duration | 32 bc | 35 b | 35 bc | 37 a | 30 ab |
| 4 | DICAMBA + DASS-Na***-duration | 42 a | 45 a | 45 a | 38 a | 32 a |
| 5 | DICAMBA + MEA + DASS-Na-duration | 32 bc | 38 ab | 37 b | 33 ab | 32 a |

TABLE 4-continued

EFFECT of DTPA-Na and MEA on DICAMBA VOLATILITY to TOMATO - EXPERIMENT 1-20 gpa and 25 psi

| TRT NO. | TREATMENT | % INJURY 7 DAT | % INJURY 10 DAT | % INJURY 14 DAT | % INJURY 21 DAT | % INJURY 28 DAT |
|---|---|---|---|---|---|---|
| 6 | DICAMBA – 1 DAT[+] (In 1st DAT out 2nd DAT) | 33 b | 37 b | 35 bc | 32 abc | 25 abcd |
| 7 | DICAMBA + MEA 1 DAT | 33 b | 33 bc | 32 bc | 28 bcd | 23 abcde |
| 8 | DICAMBA + DASS-Na – 1 DAT | 25 cd | 23 def | 23 d | 27 bcde | 22 bcdef |
| 9 | DICAMBA + MEA + DASS-Na – 1 DAT | 20 defg | 22 def | 23 d | 23 defg | 12 ghij |
| 10 | DICAMBA – 2 DAT (In 2nd DAT out 3rd DAT) | 13 gh | 23 def | 20 de | 15 hij | 18 cdefgh |
| 11 | DICAMBA + MEA 2 DAT | 17 efgh | 22 def | 10 ghi | 13 hijk | 17 defgh |
| 12 | DICAMBA + DASS-Na – 2 DAT | 10 h | 22 def | 13 fgh | 18 fghi | 13 fghij |
| 13 | DICAMBA + MEA + DASS-Na – 2 DAT | 20 defg | 25 de | 2 kl | 18 fghi | 13 fghij |
| 14 | DICAMBA – 3 DAT (In 3rd DAT out 4th DAT) | 20 defg | 22 def | 2 kl | 8 jkl | 7 ijk |
| 15 | DICAMBA + MEA – 3 DAT | 23 de | 20 def | 0 l | 13 hijk | 5 jk |
| 16 | DICAMBA + DASS-Na – 3 DAT | 22 def | 17 fg | 2 kl | 7 klm | 7 ijk |
| 17 | DICAMBA + MEA + DASS-Na – 3 DAT | 15 fgh | 17 fg | 8 hij | 5 lm | 10 hij |
| 18 | DICAMBA – 4 DAT (In 4th DAT out 5th DAT) | 25 cd | 27 cd | 15 efg | 25 cdef | 22 bcdef |
| 19 | DICAMBA + MEA – 4 DAT | 27 bcd | 25 de | 7 ijk | 25 cdef | 25 abcd |
| 20 | DICAMBA + DASS-Na – 4 DAT | 25 cd | 23 def | 3 jkl | 20 efgh | 13 fghij |
| 21 | DICAMBA + MEA + DASS-Na – 4 DAT | 15 fgh | 20 def | 5 ijkl | 0 m | 13 fghij |
| 22 | DICAMBA – 7 DAT (In 7th DAT out 8th DAT) | 17 efgh | 18 ef | 20 de | 17 ghi | 7 ijk |
| 23 | DICAMBA + MEA – 7 DAT | 17 efgh | 8 h | 23 d | 17 ghi | 15 efghi |
| 24 | DICAMBA + DASS-Na – 7 DAT | 17 efgh | 10 gh | 23 d | 7 klm | 18 cdefgh |
| 25 | DICAMBA + MEA + DASS-Na – 7 DAT | 15 fgh | 3 hi | 17 ef | 12 ijkl | 20 cdefg |
| | LSD (0.05) | 7 | 7 | 7 | 7 | 8 |

*DICAMBA DGA (diglycolamine salt) = CLARITY applied at 0.50 lb a.e./A applied to bare field soil, treated wet kept wet
**MEA is Monoethanolamine - 50% concentration - Sigma 2017
***DTPA-Na DASS aqueous stock solution made per Buettner method, Univ. of Iowa 2008 (DTPA in NaOH & RO water solution) (0.394% DTPA) - so 2.54% DASS solution provides ~1% DTPA
[+]DAT = days after treatment when tomato plants of approximately equal size are inserted into ring of treated soil for 24 hours then removed and grown on the bench
NOTE:
Only three reps due to limited space Because other modifications and changes varied to fit particular operating requirements and environments will be apparent to those skilled in the art, the disclosure is not considered limited to the example chosen for purposes of illustration, and covers all changes and modifications which do not constitute departures from the true spirit and scope of this disclosure.

Accordingly, the foregoing description is given for clearness of understanding only, and no unnecessary limitations should be understood therefrom, as modifications within the scope of the disclosure may be apparent to those having ordinary skill in the art.

All patents, patent applications, government publications, government regulations, and literature references cited in this specification are hereby incorporated herein by reference in their entirety. In case of conflict, the present description, including definitions, will control.

Throughout the specification, where the compositions, processes, kits, or apparatus are described as including components, steps, or materials, it is contemplated that the compositions, processes, or apparatus can also comprise, consist essentially of, or consist of, any combination of the recited components or materials, unless described otherwise. Component concentrations can be expressed in terms of weight concentrations, unless specifically indicated otherwise. Combinations of components are contemplated to include homogeneous and/or heterogeneous mixtures, as would be understood by a person of ordinary skill in the art in view of the foregoing disclosure.

What is claimed is:

1. A composition comprising:
   (a) water;
   (b) an aminopolycarboxylate salt water conditioner present in an amount ranging from 0.1 wt. % to 10 wt. % based on the total weight of the composition;
   (c) at least one of a volatile growth regulator herbicide present in an amount ranging from 0.01 wt. % to 10 wt. % based on the total weight of the composition, a glyphosate herbicide present in an amount ranging from 0.01 wt. % to 10 wt. % based on the total weight of the composition, and a weakly anionic herbicide present in an amount ranging from 0.01 wt. % to 10 wt. % based on the total weight of the composition; and
   (d) one or more hard water cations selected from the group consisting of $Ca^{2+}$ ions, $Mg^{2+}$ ions, $Fe^{2+}$ ions, $Fe^{3+}$ ions, $Al^{3+}$ ions, and combinations thereof;
   wherein:
      the composition has a pH value of at least 4.5;
      the composition is in the form of a spray solution containing (a) the water, (b) the aminopolycarboxylate salt, (c) the at least one of the volatile growth regulator herbicide, the glyphosate herbicide, and the weakly anionic herbicide, and (d) the hard water cations; and the composition contains less than 5 wt. % based on the total weight of the composition of any salts between the hard water cations and the at least one of the volatile growth regulator herbicide, the glyphosate herbicide, and the weakly anionic herbicide.

2. The composition of claim 1, wherein the aminopolycarboxylate salt comprises a metal salt of an aminopolycarboxylic acid selected from the group consisting of diethylenetriaminepentaacetic acid (DTPA), ethylenediaminetetraacetic acid (EDTA), hydroxyethylethylenediaminetriacetic acid (HEDTA), nitrilotriacetic acid (NTA), and iminodiacetic acid (IDA).

3. The composition of claim 2, wherein the aminopolycarboxylate salt comprises an alkali metal salt of the aminopolycarboxylic acid.

4. The composition of claim 1, wherein:
the composition comprises the volatile growth regulator herbicide; and
the volatile growth regulator herbicide comprises one or more of 2,4-dichlorophenoxyacetic acid (2,4-D), 2,4,5-trichlorophenoxyacetic acid (2,4,5-T), 2-methyl-4-chlorophenoxyacetic acid (MCPA), 2-(2-methyl-4-chlorophenoxy)propionic acid (mecoprop, MCPP), 4-(4-chloro-o-tolyloxy)butyric acid (MCPB), 2-(2,4-dichlorophenoxy)propionic acid (dichlorprop, 2,4-DP), (2,4-dichlorophenoxy)butyric acid (2,4-DB), 3,6-dichloro-2-methoxybenzoic acid (dicamba), 4-amino-3,5,6-trichloropicolinic acid (picloram), 3,5,6-trichloro-2-pyridinyloxyacetic acid (triclopyr), 3,6-dichloro-2-pyridinecarboxylic acid (clopyralid), salts thereof, esters thereof, and amides thereof.

5. The composition of claim 1, wherein:
the composition comprises the volatile growth regulator herbicide; and
the volatile growth regulator herbicide comprises one or more of salts and esters of 2,4-dichlorophenoxyacetic acid (2,4-D) and 3,6-dichloro-2-methoxybenzoic acid (dicamba).

6. The composition of claim 1, wherein:
the composition comprises the volatile growth regulator herbicide;
the volatile growth regulator herbicide comprises one or more of salts and esters of 2,4-dichlorophenoxyacetic acid (2,4-D), and
the composition is free from volatile growth regulator herbicides other than 2,4-dichlorophenoxyacetic acid (2,4-D) and derivatives thereof.

7. The composition of claim 1, wherein:
the composition comprises the volatile growth regulator herbicide;
the volatile growth regulator herbicide comprises one or more of salts and esters of 3,6-dichloro-2-methoxybenzoic acid (dicamba), and
the composition is free from volatile growth regulator herbicides other than 3,6-dichloro-2-methoxybenzoic acid (dicamba) and derivatives thereof.

8. The composition of claim 1, wherein:
the composition comprises the volatile growth regulator herbicide.

9. The composition of claim 1, wherein:
the composition comprises the glyphosate herbicide; and
the glyphosate herbicide comprises one or more of glyphosate (N-(phosphonomethyl)glycine), salts thereof, and esters thereof.

10. The composition of claim 1, wherein:
the composition comprises the glyphosate herbicide.

11. The composition of claim 1, wherein:
the composition comprises the weakly anionic herbicide; and
the weakly anionic herbicide comprises one or more of glufosinate, bentazon, salts thereof, and esters thereof.

12. The composition of claim 1, wherein:
the composition comprises the weakly anionic herbicide.

13. The composition of claim 1, wherein:
the composition comprises the volatile growth regulator herbicide; and
the composition is substantially free from salts of volatile growth regulator herbicide and the hard water cations.

14. The composition of claim 1, wherein:
the composition comprises the glyphosate herbicide; and
the composition is substantially free from salts of the glyphosate herbicide and the hard water cations.

15. The composition of claim 1, wherein the hard water cations are in the form of a metal complex with the aminopolycarboxylate salt.

16. The composition of claim 1, wherein the composition has a pH value in a range from 4.5 to 10.

17. The composition of claim 1, further comprising a monosaccharide.

18. The composition of claim 1, further comprising one or more additives selected from the group consisting of other water conditioners, surfactants, antifoaming agents, and anti-drift agents.

19. The composition of claim 1, wherein the aminopolycarboxylate salt, the volatile growth regulator herbicide, and the glyphosate herbicide are present in the composition at concentrations suitable for application to a target area comprising an undesired plant which is to be targeted by the volatile growth regulator herbicide and the glyphosate herbicide, and which is sensitive to the volatile growth regulator herbicide and the glyphosate herbicide.

20. The composition of claim 1, wherein the aminopolycarboxylate salt, the volatile growth regulator herbicide, and the glyphosate herbicide are present in the composition at elevated concentrations unsuitable without prior dilution for application to a target area comprising an undesired plant which is to be targeted by the volatile growth regulator herbicide and the glyphosate herbicide, and which is sensitive to the volatile growth regulator herbicide and the glyphosate herbicide.

21. The composition of claim 1, wherein the aminopolycarboxylate salt comprises a metal salt of an aminopolycarboxylic acid selected from the group consisting of diethylenetriaminepentaacetic acid (DTPA), hydroxyethylethylenediaminetriacetic acid (HEDTA), nitrilotriacetic acid (NTA), and iminodiacetic acid (IDA).

22. The composition of claim 1, wherein the aminopolycarboxylate salt comprises a potassium or sodium salt of diethylenetriaminepentaacetic acid (DTPA).

23. A method for controlling undesired plants, the method comprising:
(a) providing a composition according to claim 1;
(b) applying the composition to a target area comprising:
(i) optionally a first desired plant which is resistant or tolerant to the at least one of the volatile growth regulator herbicide, the glyphosate herbicide, and the weakly anionic herbicide, and (ii) an undesired plant which is to be targeted by the at least one of the volatile growth regulator herbicide, the glyphosate herbicide, and the weakly anionic herbicide, and which is sensitive to the at least one of the volatile growth regulator herbicide, the glyphosate herbicide, and the weakly anionic herbicide; and (c) controlling the undesired plant in the target area with the applied composition.

24. The method of claim 23, wherein the target area comprises the first desired plant which is resistant or tolerant to the at least one of the volatile growth regulator herbicide, the glyphosate herbicide, and the weakly anionic herbicide.

25. The method of claim 23, wherein the undesired plant to be targeted comprises at least one of broadleaf weeds and grasses.

26. The method of claim 23, wherein the target area is adjacent to a collateral area comprising a second desired plant which is to be protected from the at least one of the volatile growth regulator herbicide, the glyphosate herbicide, and the weakly anionic herbicide, and which is sensitive to the at least one of the volatile growth regulator herbicide, the glyphosate herbicide, and the weakly anionic herbicide.

* * * * *